US008543562B2

(12) United States Patent
Mule

(10) Patent No.: US 8,543,562 B2
(45) Date of Patent: Sep. 24, 2013

(54) AUTOMATED SEARCHING FOR SOLUTIONS TO SUPPORT SELF-DIAGNOSTIC OPERATIONS OF WEB-ENABLED DEVICES

(75) Inventor: Sachin D. Mule, Bangalore (IN)

(73) Assignee: Sling Media Pvt Ltd, Bangalore (IN)

( * ) Notice: Subject to any disclaimer, the term of this patent is extended or adjusted under 35 U.S.C. 154(b) by 169 days.

(21) Appl. No.: 12/948,990

(22) Filed: Nov. 18, 2010

(65) Prior Publication Data

US 2012/0130968 A1    May 24, 2012

(51) Int. Cl.
*G06F 17/30*    (2006.01)

(52) U.S. Cl.
USPC .......................................... 707/706; 707/707

(58) Field of Classification Search
USPC .................... 707/705–707, 999.003–999.005
See application file for complete search history.

(56) References Cited

U.S. PATENT DOCUMENTS

| 6,115,645 | A | 9/2000 | Berar |
| 6,892,317 | B1 | 5/2005 | Sampath et al. |
| 8,005,853 | B2 * | 8/2011 | Cancilla et al. ............... 707/759 |
| 2006/0167844 | A1 * | 7/2006 | Srinivas et al. ................... 707/3 |
| 2007/0124367 | A1 | 5/2007 | Fan et al. |
| 2010/0205174 | A1 | 8/2010 | Jiang et al. |

OTHER PUBLICATIONS

Yahoo! Inc. "Search Engine" homepage, retrieved from the Internet on Nov. 18, 2010 at http://search.yahoo.com/, 1 page.
Google "Search Engine" homepage, retrieved from the Internet on Nov. 18, 2010 at http://www.google.com/, 1 page.
Microsoft Corporation "Bing Search Engine" homepage, retrieved from the Internet on Nov. 18, 2010 at http://www.bing.com/, 15 pages.
Wikipedia The Free Encyclopedia "Search Engine" homepage, retrieved from the Internet on Nov. 18, 2010 at http://en.wikipedia.org/wiki/Web_search_engine, 7 pages.
Wikipedia The Free Encyclopedia "Yahoo!" search page, retrieved from the Internet on Nov. 18, 2010 at http://en.wikipedia.org/wiki/Yahoo.com, 15 pages.
Wikipedia The Free Encyclopedia "Bing (Search Engine)" search page, retrieved from the Internet on Nov. 18, 2010 at http://en.wikipedia.org/wiki/Bing.com, 9 pages.
Wikipedia The Free Encyclopedia "Google Search" search page, retrieved from the Internet on Nov. 18, 2010 at http://en.wikipedia.org/wiki/Google.com, 9 pages.
European Patent Office, International Searching Authority, International Search Report mailed Apr. 10, 2012; International Appln. No. PCT/IN2011/000799, filed Nov. 17, 2011, 3 pages.

* cited by examiner

*Primary Examiner* — Monica Pyo
(74) *Attorney, Agent, or Firm* — Ingrassia Fisher & Lorenz, P.C.

(57) ABSTRACT

An automated diagnostic system is presented here. The system includes a network-enabled device, a remote network-based search engine, and a data communication network to facilitate data communication between the network-enabled device and the remote network-based search engine. The device automatically detects a problem, error, or failure associated with its operation, and automatically sends a corresponding search query to the remote network-based search engine. The search engine receives the search query and, in response to the search query, searches for relevant information pertaining to the problem, error, or failure, and sends a corresponding response to the network-enabled device. The response includes response data having some contextual association with the solution. The device receives the response, processes at least some of the response data to determine a course of action, and initiates that course of action.

20 Claims, 3 Drawing Sheets

AUTOMATED SEARCHING FOR SOLUTIONS TO SUPPORT SELF-DIAGNOSTIC OPERATIONS OF WEB-ENABLED DEVICES

TECHNICAL FIELD

Embodiments of the subject matter described herein relate generally to electronic devices and systems, and related data communication technologies. More particularly, embodiments of the subject matter relate to a search engine service that supports automated self-diagnostic operations of web-enabled devices.

BACKGROUND

Electronic devices, computer networks, and intelligent machines are well known. Many electronic devices, such as household appliances and computer equipment, are capable of running self-diagnostic operations to assess their functional health. For example, some household appliances generate error codes or failure reports in response to a self-diagnosed problem, failure, error, or the like. Traditionally, such self-generated error codes or reports must be reviewed and interpreted by a human operator. Moreover, the reported problems or issues are traditionally resolved with some human interaction or involvement. Other machines, systems, and devices are often faced with problems, unknown situations, errors, or failures that usually require human involvement and human problem-solving. Such human involvement can be time consuming, costly, and inconvenient.

Computerized search engines and searching services are also well known. For example, various websites allow a user to search for web content using simple keyword searches or more complex searches using logical operators, special searching syntax, or the like. Web-based search engines obtain user search queries and search for relevant websites that might contain information that matches the search queries. Such traditional search engines, however, are designed for humans. Accordingly, a significant amount of human involvement is required: entering the search criteria; initiating the search; reading and interpreting the search results; and taking appropriate action based on the search results.

It is desirable to have a fully automated web-based searching service for electronic devices, intelligent machines, robots, systems, and other web-enabled inanimate devices. In addition, it is desirable to support self-diagnostic operations for web-enabled devices with little to no human involvement. Furthermore, other desirable features and characteristics will become apparent from the subsequent detailed description and the appended claims, taken in conjunction with the accompanying drawings and the foregoing technical field and background.

BRIEF SUMMARY

An automated self-diagnostic method for a device having data connectivity to a remote network-based search engine is presented here. The method can be performed or executed by the device in an automated manner. The method begins by determining that the device requires a solution to a problem. The method continues by generating a search query intended to find information related to the solution, the problem, or both, where the search query is generated in compliance with a format supported by the network-based search engine. The device sends the search query to the remote network-based search engine, and thereafter receives a response from the remote network-based search engine. The response includes response data having some contextual association with the solution, the problem, or both. The device then processes at least some of the response data to determine a course of action, and initiates the course of action.

Another automated self-diagnostic method for a device having data connectivity to a remote network-based search engine is also provided. The method can be performed by the remote network-based search engine. The method begins by receiving a search query at the remote network-based search engine, where the search query is intended to find information necessary for the device to address a self-diagnosed problem that requires a solution. The search query is automatically generated by the device without any human involvement, and the search query is arranged in compliance with a format supported by the remote network-based search engine. The method continues by processing the search query to identify search parameters, searching for information using the search parameters, and generating a response that includes response data having some contextual association with the problem, the solution, or both. The response is sent from the remote network-based search engine to the device.

Also provided is an automated diagnostic system. The system includes a network-enabled device, a remote network-based search engine, and a data communication network to facilitate data communication between the network-enabled device and the remote network-based search engine. The network-enabled device automatically detects a problem, error, or failure associated with its operation, and automatically sends a corresponding search query to the remote network-based search engine. The search query is intended to find information related to a solution to the problem, error, or failure. The remote network-based search engine receives the search query and, in response to the search query, searches for relevant information pertaining to the problem, error, or failure, and sends a corresponding response to the network-enabled device. The response includes response data having some contextual association with the solution. The network-enabled device receives the response, processes at least some of the response data to determine a course of action, and initiates the course of action.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The subject matter presented here relates to the provisioning and use of an automated search engine or service that can be polled by autonomously operating machines, electronic devices, inanimate systems, and the like. In practice, the search system will implement predefined and standardized communication protocols and search query formatting for compatibility between devices that issue search queries and the search engines that respond to the search queries.

Figure 1:
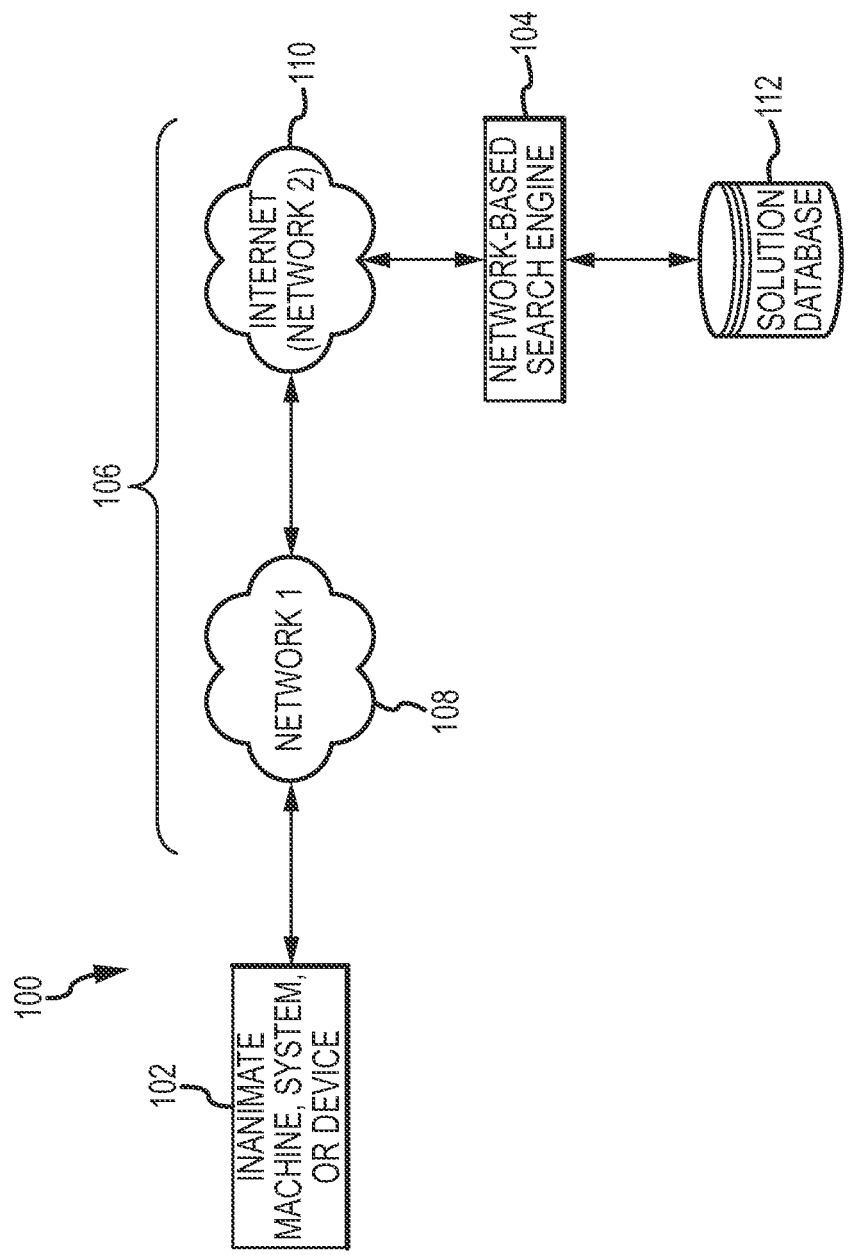
FIG. 1 is a schematic representation of an automated diagnostic system according to an exemplary embodiment.

FIG. 1 is a schematic representation of an automated diagnostic system 100 according to an exemplary embodiment. The system 100 generally includes, without limitation: one or more inanimate network-enabled devices 102; one or more remote network-based search engines 104; and a network architecture 106 that accommodates data communication between the devices 102 and the search engines 104. For simplicity, FIG. 1 depicts only one device 102 and only one search engine 104. In practice, however, the system could support any number of different devices (which may be co-located or remotely located relative to one another) and any number of different search engines 104. The illustrated implementation of the network architecture 106 includes two different networks: a first data communication network 108; and a second data communication network 110.

As used here, the device 102 is any inanimate device having the logical and processing power necessary to support the functionality described here. In certain embodiments, the device 102 may be, without limitation: a machine; a system; a robot; a computer or computing device; a smart component; a portable electronic device; a home appliance (e.g., an oven, an intelligent vacuum cleaner, a refrigerator, or a television); an electronic toy; factory equipment; a video services receiver (e.g., a set-top box used for a satellite or cable television provider); a video placeshifting device; a digital video disc (DVD) player; or the like. The functionality and feature set of the device 102 will vary depending upon the particular device type, the manner in which it is implemented, and its intended use.

The network architecture 106 can be realized using any number of physical, virtual, or logical components, including hardware, software, firmware, and/or processing logic configured to support data communication between an originating component and a destination component, where data communication is carried out in accordance with one or more designated communication protocols over one or more designated communication media. For the illustrated embodiment, the network architecture 106 facilitates data communication between the device 102 and the remote network-based search engine 104. In practice, the network architecture 106 may include or cooperate with, without limitation: a computer network such as a local area network (LAN) or a wide area network (WAN); a cellular telecommunication network; an 802.11 network (WLAN); an 802.16 network (WiMAX); the Internet; a hospital data communication network (WMTS or other); a control network; the public switched telephone network; a satellite communication network; or the like. In practice, network communications involving a component or an element of the system 100 may be routed using two or more different types of data communication networks using known or proprietary network interfacing techniques.

Although FIG. 1 depicts two separate data communication networks in the network architecture 106, an embodiment of the system 100 could utilize a single network if so desired. FIG. 1 illustrates one implementation where the first data communication network 108 could represent an intranet or a localized short range network, and where the second data communication network 110 could represent a public network. Alternatively, these two network architectures could be one and the same. Moreover, either the first data communication network 108 or the second data communication network 110 could be implemented as a set of networks arranged in a hierarchical manner. For example, the second data communication network 110 could include a plurality of different networks, such as an intranet LAN and a 3G wireless network. As another example, the first data communication network 108 could be realized as a LAN having multiple levels.

In certain embodiments, the first data communication network 108 is suitably configured to support traditional operations in a wireless environment, and the second data communication network 110 includes or is realized as the Internet. Accordingly, the first data communication network 108 and the device 102 may be compatible with IEEE Specification 802.11 (any variation) and/or a short range wireless protocol such as the BLUETOOTH wireless protocol for purposes of wireless communication. Wireless technologies that support 802.11 and BLUETOOTH networks are well known and, therefore, conventional aspects and conventional operating functions thereof will not be described in detail here. It should also be appreciated that the second data communication network 110 might be implemented with any number of wireless and non-wireless data communication links to establish data connectivity with the search engine 104, as is well understood.

The network-based search engine 104 can be accessed and polled by the device 102, using the network architecture 106 as a data transport mechanism for search queries and responses from the search engine 104. In preferred implementations, the device 102 is a web-enabled device that communicates with the search engine 104 using the Internet Protocol (IP), IP addresses, Uniform Resource Locators (URLs), and the like. The search engine 104 receives search queries that are automatically generated by the device 102, and searches one or more solution databases 112 in accordance with parameters, criteria, and/or instructions contained in the search queries. For the sake of simplicity, FIG. 1 depicts only one solution database 112 in communication with the search engine 104. In practice, however, the system could include any number of solution databases 112 that cooperate with the search engine 104.

During normal operation, the web-enabled device 102 is operatively coupled to the search engine 104 via the network architecture 106. The device 102 can automatically and autonomously connect to the search engine 104 when needed. In this regard, the device 102 may be suitably configured to automatically and autonomously detect a problem, error, or failure associated with its operation and, in response to such detection, contact the search engine 104. Accordingly, the device 102 initiates and sends an appropriate search query to the search engine 104 when the device is faced with a problem, error, question, situation, scenario, condition, or issue that it cannot resolve using its own native processing intelligence and logic. The search query issued by the device 102 is intended to find relevant information, data, and/or metadata related to a solution, answer, resolution, or approach to the detected scenario.

The search engine 104 receives the search query and, in response thereto, searches for relevant information pertaining to the detected scenario. For example, the search engine 104 could process the search query to extract one or more specific search parameters to be searched. If the search engine 104 discovers relevant information, solutions, answers, or content related to the detected problem, error, failure, etc., then it will generate and send a corresponding response to the device 102. For this example, the search engine 104 can prepare and send a web-based response back to the requesting device 102, where the response includes response data having some contextual association with the recommended solution, answer, resolution, or approach. Upon receipt of the response, the device 102 processes at least some of the response data, extracts the necessary problem-solving information, determines a course of action, and initiates the appropriate action. For example, the device can process the response data to identify relevant information to be used with a course of action, and to identify irrelevant information that can be disregarded, discarded, or given little to no weight.

In certain implementations, the device 102 and the search engine 104 operate in compliance with a predetermined and agreed-upon protocol, specification, or standard. In this regard, the device 102 generates search queries that are formatted in accordance with a given protocol used by the search engine 104. Similarly, the search engine 104 generates responses that are formatted in accordance with the given protocol. Consequently, the search engine 104 can receive, process, interpret, and respond to search queries issued by the device 102 and other network-based devices that function in compliance with the given protocol.

Figure 2:
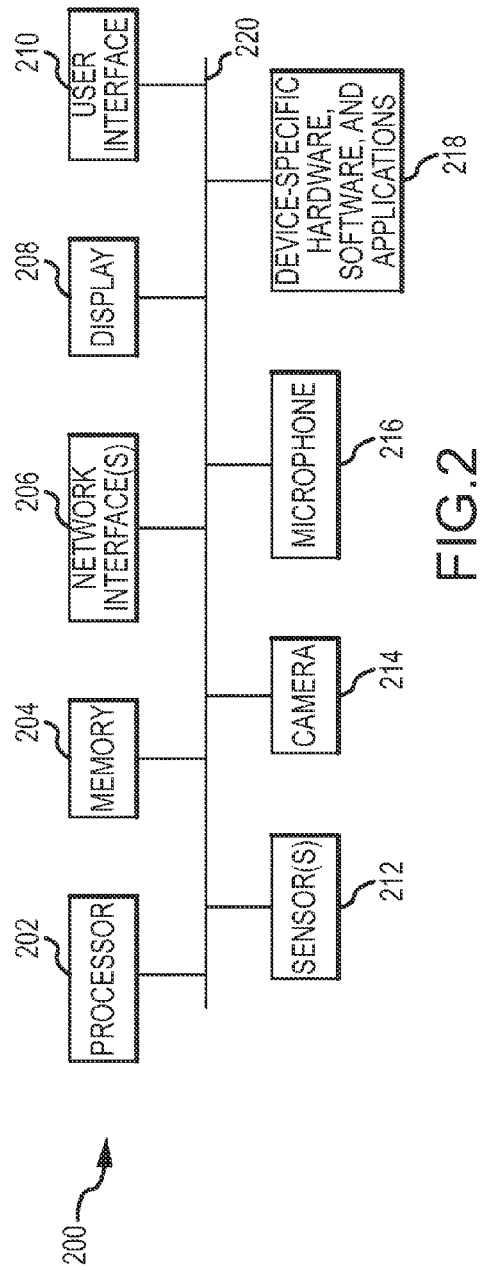
FIG. 2 is a schematic representation of an exemplary embodiment of a device that is suitable for operation in the system shown in FIG. 1.

FIG. 2 is a schematic representation of an exemplary embodiment of a network-enabled device 200 that is suitable for operation in the system shown in FIG. 1. Thus, the device 200 represents one possible embodiment of the device 102 shown in FIG. 1. For this example, the device 200 generally includes, without limitation: at least one processor 202; a suitable amount of memory 204; at least one network interface 206; a display 208; a user interface 210; at least one sensor 212; a camera 214; a microphone 216; and device-specific hardware, software, and applications 218. The elements of the device 200 are coupled together as needed by a suitably configured interconnect architecture 220 that accommodates data transfer, control/command signals, supply voltages, etc. The device 200 is shown and described in the context of a "full-featured" device that supports various features and functions. In practice, an embodiment of the device 200 need not include all of the depicted modules or features. For example, the display 208, the user interface 210, the sensor 212, the camera 214, and the microphone 216 need not always be deployed. Moreover, a practical implementation of the device 200 will include other components and elements designed to carry out conventional operations that are unrelated to the described subject matter.

The processor 202 may be implemented or performed with a general purpose processor, a content addressable memory, a digital signal processor, an application specific integrated circuit, a field programmable gate array, any suitable programmable logic device, discrete gate or transistor logic, discrete hardware components, or any combination designed to perform the mobile device functions described here. A processor may be realized as a microprocessor, a controller, a microcontroller, or a state machine. Moreover, a processor may be implemented as a combination of computing devices, e.g., a combination of a digital signal processor and a microprocessor, a plurality of microprocessors, one or more microprocessors in conjunction with a digital signal processor core, or any other such configuration.

The memory 204 may be realized as RAM memory, flash memory, EPROM memory, EEPROM memory, registers, a hard disk, a removable disk, a CD-ROM, or any other form of storage medium known in the art. In this regard, the memory 204 can be coupled to the processor 202 such that the processor 202 can read information from, and write information to, the memory 204. In the alternative, the memory 204 may be integral to the processor 202. As an example, the processor 202 and the memory 204 may reside in an ASIC.

The network interface 206 is suitably configured to support data communication operations performed by the device 200. In practice, the network interface 206 could support wireless and/or non-wireless data communication with one or more data communication networks (such as the first data communication network 108 shown in FIG. 1). In practice, the network interface 206 can be designed and configured to support any of the wireless data communication protocols, techniques, and methodologies mentioned above. In certain embodiments, therefore, the network interface 206 might cooperate with a wireless access point device in a WLAN environment. Alternatively (or additionally), the network interface 206 could support the BLUETOOTH short range wireless protocol. Moreover, the network interface 206 may be compatible with a cellular telephone network for purposes of supporting cellular telephony. In an embodiment of the device 200, the network interface 206 may include or be realized as hardware, software, and/or firmware, such as an RF front end, a suitably configured radio module (which may be a standalone module or integrated with other or all functions of the device 200), a wireless transmitter, a wireless receiver, a wireless transceiver, an infrared sensor, an electromagnetic transducer, or the like. Moreover, the device 200 may include one or more antenna arrangements that cooperate with the network interface 206.

The network interface 206 could be configured to support data communication using non-wireless techniques. In this regard, the network interface 206 may include or cooperate with appropriate hardware, such as a suitably configured and formatted data port, connector, jack, plug, receptacle, socket, adaptor, or the like. In certain embodiments, it may be possible for a user of the device 200 to physically connect the network interface 206 of the device 200 to a cradle, a dock, or a USB port located within the operating environment.

The display 208 might represent the primary graphical interface of the device 200. The display 208 may leverage known display technologies such as, without limitation: liquid crystal display, thin-film transistor, organic light-emitting diode, interferometric modulator display, touch screen, and/or other display technologies. The actual size, resolution, and operating specifications of the display 208 can be selected to suit the needs of the particular application. The display 208 could be employed to inform the user of a detected problem, error, or failure, to present search query information to the user, and/or to display search results or solutions to the user. The display 208 can also be operated to display control or configuration parameters of the device 200, or to otherwise enable the user to interact with the device 200 or the system in an appropriate manner.

The user interface 210 may include or be realized as one or more buttons, input/output elements, switches, or other features that enable the user to interact with the device 200. In certain embodiments, the user interface 210 can be manipulated as needed to control, modify, or otherwise influence the search related functionality of the device 200, to control, initiate, or carry out corrective or remedial actions associated with solutions recommended by a search engine, or the like.

One or more sensors 212 may be provided with the device 200 to enable the device 200 to obtain, detect, or capture information related to its surrounding environment and/or information related to its internal operation. Depending upon the embodiment and configuration of the device 200, one or more of the following sensor types could be utilized (without limitation): a global positioning system (GPS) receiver; an accelerometer; a gyroscopic element; a force sensor; optical emitters; a thermometer; a sonic transducer; a magnetic field sensor; a voltmeter; a barometer; or the like. The information obtained from the sensors 212 can be used by the device 200 to assess whether there is a need to issue a search query to a search engine.

Although depicted separately, the camera 214 and the microphone 216 represent two distinct types of sensors 212. The camera 214 can be used to capture still and/or video images, and the microphone 216 can be used to capture sounds or audio content near the device 200. In practice, the camera 214 could capture digital images so that the device 200 can generate digital picture files and send picture files with search queries if so desired. Likewise, the microphone 216 could be used as a source of digital audio file content. The device 200 can generate digital audio files and send the audio files with search queries if so desired.

The device-specific hardware, software, and applications 218 may vary from one embodiment of the device 200 to another. Accordingly, if the device 200 is embodied as a robotic vacuum cleaner, then the device-specific hardware, software, and or applications 218 will support a variety of features related to the vacuum cleaner functionality, automated movement control, obstruction detection, etc. As another example, if the device 200 is embodied as a digital media player device, then the device-specific hardware, software, and applications 218 will support various operations and functions related to the playback and presentation of digital media content. Accordingly, the device-specific hardware, software, and applications 218 will support the desired functions, operations, and processing requirements of the particular implementation of the device 200.

Figure 3:
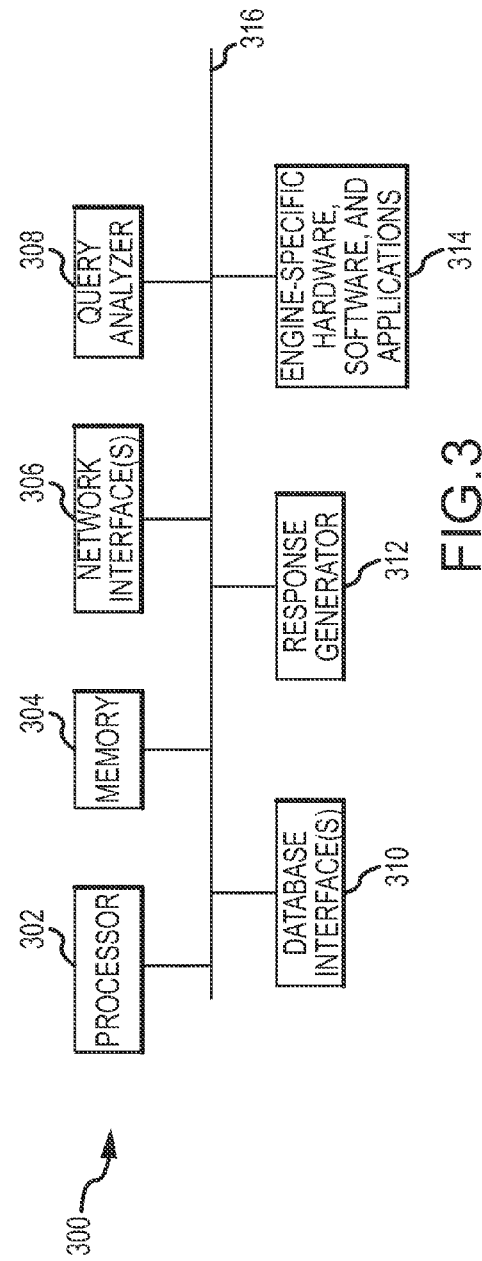
FIG. 3 is a schematic representation of an exemplary embodiment of a network-based search engine suitable for operation in the system shown in FIG. 1.

FIG. 3 is a schematic representation of an exemplary embodiment of a network-based search engine 300 that is suitable for operation in the system shown in FIG. 1. Thus, the search engine 300 represents one possible embodiment of the search engine 104 shown in FIG. 1. For this example, the search engine 300 generally includes, without limitation: at least one processor 302; a suitable amount of memory 304; at least one network interface 306; a query analyzer 308; at least one database interface 310; a response generator 312; and engine-specific hardware, software, and applications 314. The elements of the search engine 300 are coupled together as needed by a suitably configured interconnect architecture 316 that accommodates data transfer, control/command signals, supply voltages, etc. It should be appreciated that a practical implementation of the search engine 300 will include other components and elements designed to carry out conventional operations that are unrelated to the described subject matter.

The processor 302, the memory 304, and the network interface 306 are generally configured as described above for their counterparts in the device 200 and, therefore, these elements will not be redundantly described in detail here. The processor 302 is suitably configured to perform the functions and operations needed to support the various search-engine processes described herein. The network interface 306 enables the search engine 300 to support data communication with one or more data communication networks between the search engine 300 and compatible network-enabled devices (such as the device 102 shown in FIG. 1).

The query analyzer 308, which may be implemented or realized using the processor 302, processes search queries received from requesting devices in a manner that allows the search engine 300 to search one or more solution databases for relevant content. In practice, the query analyzer 308 processes a received search query to extract or otherwise identify search parameters, searchable fields, and/or searchable quantities contained in the search query. In this regard, the query analyzer 308 may cooperate with the database interface 310 such that the search engine 300 can intelligently and properly poll and search one or more solution databases with which it communicates. Accordingly, the database interface 310 is suitably configured to support the particular data communication protocols and data formatting used by the solution databases.

The response generator 312, which may be implemented or realized using the processor 302, is responsible for generating responses to search queries. In this regard, a response will include response data having some contextual relationship or association with the identified problem, the recommended solution, or both. Notably, the content of the response and the manner in which the response is configured and formatted might be governed by certain standards, protocols, or specifications, which may be implemented to ensure compatibility between the search engine 300 and the requesting web-based devices.

The engine-specific hardware, software, and applications 314 may vary from one embodiment of the search engine 300 to another. In practice, the engine-specific hardware, software, and applications 314 will support the desired functions, operations, and processing requirements of the particular implementation of the search engine 300. The engine-specific hardware, software, and applications 314 may also support a number of conventional features and functions that are unrelated to the core search engine functions described here.

Figure 4:
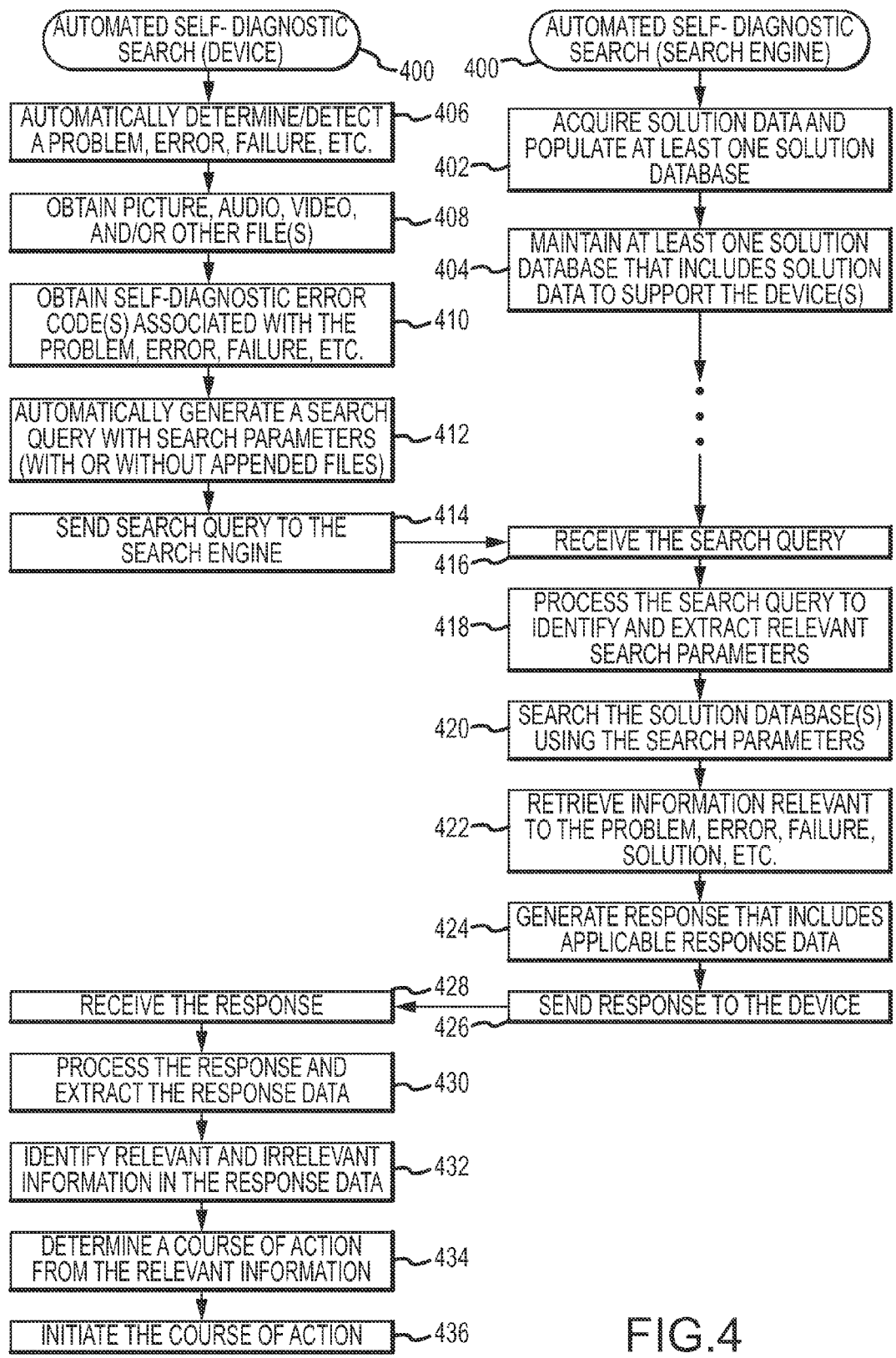
FIG. 4 is a flow chart that illustrates an exemplary embodiment of an automated self-diagnostic search process.

FIG. 4 is a flow chart that illustrates an exemplary embodiment of an automated self-diagnostic search process 400, which may be performed by an automated diagnostic system as described here. The various tasks performed in connection with the process 400 may be performed by software, hardware, firmware, or any combination thereof. For illustrative purposes, the following description of the process 400 may refer to elements mentioned above in connection with FIGS. 1-3. In practice, portions of the process 400 may be performed by different elements of the described system, e.g., a network-enabled device, a network-based search engine, a solution database, or the like. It should be appreciated that the process 400 may include any number of additional or alternative tasks, the tasks shown in FIG. 4 need not be performed in the illustrated order, and the process 400 may be incorporated into a more comprehensive procedure or process having additional functionality not described in detail herein. Moreover, one or more of the tasks shown in FIG. 4 could be omitted from an embodiment of the process 400 as long as the intended overall functionality remains intact.

The illustrated embodiment of the process 400 includes some tasks performed by a network-enabled device and other tasks performed by a network-based search engine. Accordingly, FIG. 4 depicts tasks performed by the device vertically aligned near the left side of the page, and tasks performed by the search engine vertically aligned near the right side of the page. In preferred implementations, the search engine is preconfigured and initialized before it is actually deployed or placed "live" in the system. In this regard, the process 400 may acquire an amount of solution data and populate at least one solution database with the solution data (task 402). The solution data could be obtained from one or more sources, and by way of any suitable data communication methodology (including manual loading or programming). For example, solution data associated with the maintenance, control, or repair of a particular product, system, or apparatus might be provided by the manufacturer, vendor, or supplier of that product, system, or apparatus. Thus, maintenance and support data could be acquired from the manufacturers of household appliances such as refrigerators, ovens, or stovetops. As another example, solution data associated with software programs, electronic devices, or computer systems might be obtained and saved in the solution databases.

In certain practical embodiments, it might be desirable to have the component and device manufacturers populate and update the solution databases. In practice, a single physical instantiation of a device could incorporate components or devices from different manufacturers and, therefore, multiple entities may be responsible for populating content of a solution database for one device. Moreover, there could be other search engines (hosted by third party entities) that assist in image, video, and/or sound recognition. Such third party search engines can cooperate with any or all of the search engines and solution databases described here. For example, a manufacturer may choose to host its own solution database and search engine, which could cooperate with the system described above. In this context, a device manufacturer's search engine could collaborate with a component manufacturer's search engine (and/or with content recognition engines) to provide an optimal solution. Accordingly, a system might be deployed as a network of search engines.

With continued reference to FIG. 4, after acquiring the initial set of solution data, the network-based search engine can maintain the solution databases that contain the solution data, such that the solution data can be retrieved when needed (task 404). In connection with such maintenance, it may be desirable for the search engine to index the data contained in the solution databases to facilitate quick and efficient searching and retrieval of solution data. The search engine could leverage conventional and known techniques and technologies to maintain, index, and otherwise handle the solution data. It should be appreciated that tasks 402 and 404 could be performed whenever needed to update, modify, or change the contents of the solution databases in the system.

This description assumes that the search engine is in data communication with at least one solution database that has been initialized and populated with relevant solution data. Accordingly, an automated search can be initiated by any network-enabled device that is compatible with the search engine. This particular example begins when the network-enabled device automatically determines or detects a problem, error, failure, issue, or scenario that requires a solution (task 406). In certain embodiments, this determination is automatically and autonomously performed by the network-enabled device using its own native functionality and processing capabilities. Task 406 may be associated with one or more of the following scenarios, without limitation: a self-diagnosed problem; the generation of an error code or message; the detection of a situation or scenario for which the device has no known solution, approach, or resolution; the detection of an unknown object or environmental condition; or the like. For example, if the machine is a cleaning robot that detects an unknown object in its path, then it might automatically determine that it needs more information regarding the object before it can clean it in a proper manner.

Depending upon the capabilities of the network-enabled device and/or the characteristics of the detected scenario, the device may carry out one or more self-diagnostic tasks to support the process 400. For example, it may be desirable or recommended to obtain a digital picture file, a digital audio file, a digital video file, and/or other electronic files that could be used to search for and identify information relevant to the present situation (task 408). In this regard, a digital picture file might correspond to an image of an object that is in close proximity to the device, where the device obtains the digital picture file using an onboard camera. In certain embodiments, the device could obtain a digital audio file using an onboard microphone and native audio processing capabilities. Similarly, the device could obtain a digital video file using an onboard camera and native video processing capabilities.

In some embodiments, the network-enabled device obtains a self-diagnostic error code associated with a problem, error, failure, or the like (task 410). The device might be able to address and resolve many routine and common error codes automatically and autonomously without involving the search engine. On the other hand, the device may not recognize the error code and/or it may not have the native ability or intelligence to properly handle the error code. Accordingly, the process 400 can be utilized to process "unknown" error codes, or error codes for which the device has no present solution.

In response to the automatic detection of a problem or situation that satisfies certain predetermined criteria, the device generates a request or search query that contains specified search parameters, searching criteria, search fields, or the like (task 412). Notably, the search query is intelligently generated and intended to find information related to the scenario detected during task 406, and/or related to at least one solution, resolution, approach, procedure, or answer associated with the scenario detected during task 406. In preferred implementations, the device automatically and autonomously generates the search query without any human involvement.

Depending upon the situation and the native capabilities of the device, the search query may or may not include files appended thereto. For example, the device might append a digital picture file, a digital audio file, a digital video file, a text file, an error code, or other type of electronic file to the search query for purposes of transmission to the search engine(s). In connection with an appended digital picture file, the search query might also include a request to identify the object or subject matter of the digital picture file. For an appended digital audio file, the search query might also include a request to identify at least one characteristic of sound conveyed by the digital audio file. For example, the device might request information related to or otherwise associated with the content of the digital audio file, such as, without limitation: a source or origin of the sound; a sound pressure level measurement; a frequency analysis; whether the sound is natural or artificial; whether or not the sound was created by a human; etc. In connection with an appended digital video file, the search query might also include a request for information related to the subject matter conveyed by the digital video file. For example, the device might request information such as, without limitation: an identification of the object(s) or subject matter; a source or origin of the video content; the location captured by the video; or the like. For an appended error code, the search query might also include a request for corrective action, a solution, or a resolution that is intended to address the error code.

The search query is generated in compliance with a designated and predetermined format, protocol, or standard that is supported by the network-based search engines in the system. In this regard, the search query might include certain designated fields, content, descriptors, and/or other information that can be readily interpreted and processed by the search engines. The network-enabled device sends the search query to at least one remote network-based search engine (task 414). For this particular web-enabled embodiment, each network-based search engine has a corresponding URL associated therewith, and the search query issued by the device includes the URL of at least one search engine. This facilitates routing of the search query via the Internet.

In practice, the system could support a plurality of different search engines. Accordingly, it may be necessary for the process 400 to identify or otherwise select which search engine(s) to use. For example, the device could be suitably configured to only use one or more trusted search engines. In such situations, there could be different search engines configured for purposes of diagnosis and for analyzing content (e.g., images, sounds, videos, etc.). In accordance with one exemplary embodiment, the device first confirms that it is accessing a trusted search engine. This could be done by validating a certificate, e.g., the server certificate. In practice, some type of validation might also be performed before downloading the solution.

This example assumes that the search engine successfully receives the search query (task 416). The search engine can then determine how best to search for the information needed to help the machine resolve the particular problem. Accordingly, the search engine performs or manages one or more searches to obtain a solution, answer, diagnosis, or resolution to the stated problem. To this end, upon receipt of the search query, the search engine processes the query in an appropriate manner (task 418). In this regard, the search engine might identify and extract specific search parameters, search fields, searching instructions, and/or other searchable content contained in or otherwise conveyed by the search query. Notably, the search will be conducted in accordance with the predetermined protocol, which recognizes the search fields, criteria, and parameters. In certain embodiments, the search engine searches for relevant information using some or all of the identified search parameters (task 420). As mentioned above with reference to FIG. 1, the search engine could poll any number of solution databases while searching for the requested information. This description assumes that the search engine locates and retrieves at least some information that is relevant to the identified problem, error, failure, or scenario (task 422). It should be appreciated that the retrieved information might be maintained at only one solution database, or it might be collected from a plurality of different solution databases.

The search engine can then generate a suitable response that includes response data having some contextual relationship or association with the detected problem (or scenario), the suggested solution, or both (task 424). In this regard, the response data is intended for use by the network-enabled device to resolve the problem, issue, error, or failure. Notably, the response will be specifically formatted in accordance with the predetermined protocol that is supported by the search engines and the devices. Thus, the response will include certain designated fields, content, descriptors, or the like that can be processed and interpreted by the requesting device. For example, the response data might include one or more descriptors of an unknown object or subject matter conveyed in a digital image file, a digital video file, or a digital audio file appended to the search query. As another example, the response data might include or identify at least one potential source of sound conveyed by a digital audio file or a digital video file appended to the search query. As yet another example, the response data could include instructions that, when executed by the device, address or resolve an error code, where the error code was appended to the search query.

The response can then be sent to the requesting device via the designated network architecture (task 426). This example assumes that the device successfully receives the response that originated at the search engine (task 428). Upon receipt of the response, the device processes the response in an appropriate manner (task 430). In this regard, the device might identify and extract the response data contained in the response. In practice, the amount of information provided by the search engine may exceed the minimum amount needed by the requesting device. Accordingly, it may be necessary or desirable for the device to analyze and process the received response data to determine how best to resolve the problem. For example, the device might identify relevant and irrelevant information in the response data (task 432) to determine whether any of the received information can be disregarded or discarded. This example assumes that the device will use at least some of the extracted response data to determine an appropriate course of action intended to resolve the problem, error, issue, or failure (task 434). Eventually, the device can initiate the course of action and carry out the designated functions, operations, or procedures (task 436). As mentioned above, in certain situations the device could receive multiple responses from one search engine or multiple responses from a plurality of search engines. To contemplate such situations, a search engine could return a rating or grade with each proposed solution (where the rating/grade is indicative of the likelihood of resolving the stated issue). Accordingly, the device can process the response data by considering the rating of the solutions. For example, the process 400 might be designed to select the solution having the highest grade, or it might be designed to only consider solutions having a rating or score that satisfies a predetermined threshold value.

As one example, the search response data may include instructions that can be executed by the device to address the error or failure indicated by an error code appended to the initial search query. If these instructions are self-executing, then the device can resolve its problem without any human intervention. As another example, the search response data may include descriptive data related to an object, and information related to the manner in which that object ought to be treated, handled, or processed. In this regard, a cleaning robot could obtain a description of a previously unknown object (such as a television), along with parameters related to how that object ought to be cleaned (use a soft cloth, use a soft brush, do not use harsh solvents, etc.).

In certain situations, a device might issue a query for which there is no readily identifiable solution. In such situations, the search engine might return an appropriate message that notifies the device of an "unknown query" or "no solution found" status. In addition, the device or component manufacturer could be given access rights that allow it to monitor and analyze failed search queries. In response to these situations, the manufacturer can create new solutions and upload new (or modified) solutions to the solution database as needed. Thus, subsequent handling of the same or similar search query will discover at least one viable solution to the problem.

The system and methods presented here enable intelligent machines to poll a web-based search engine to automatically resolve problems and issues that might arise during operation. The machines and the search engines will operate in accordance with a stated protocol that governs the formatting and content of automated search requests and automated responses. The protocol will be defined such that the search engines can be populated in an efficient and effective manner, and such that automated searches are performed in a relevant and meaningful manner that provide useful data to the requesting machines.

As one non-limiting example, an automated diagnostic search system of the type described above could employ the following protocol to support an object search using an image captured by the network-enabled device.

```
REQUEST
    wlmp://wlmserver:1111/object/image
    content-type: application/jpg
    content-length: 2550
    --image attachment--
RESPONSE (multiple results)
<object>
    <general-name>
    <biological-name>
    <technical-name>
    <type>
    <properties>
        <physical>
            <hasLife>
            <minDimension>
            <maxDimension>
        </physical>
        <behavioral>
            <sensitivityIndex>
            <aggressiveness-index>
            <likes>
            <dislikes>
        </behavioural>
    </properties>
</object>
```

For the above example, the first line of the REQUEST identifies the search engine (wlmserver:1111) and the type of search query, namely, an object search by image. The second line of the REQUEST identifies that a digital image file (in JPEG file format) is attached, and the third line of the REQUEST indicates the length or size of the attachment.

The RESPONSE indicates that the search data corresponds to an object. This example includes a number of fields and subfields of search data that describes or defines the object conveyed in the image file. The high level fields include, without limitation: General Name; Biological Name; Technical Name; Type; and Properties. The Properties include two associated subfields: Physical and Behavioural. Moreover, the Physical subfield and the Behavioral subfield each has associated sub-subfields.

Of course, the manner in which the REQUEST and RESPONSE are formatted, the specific content of the REQUEST and the RESPONSE, the hierarchical arrangement of data fields, and the number of data fields at each hierarchical level may vary from one system to another, from one type of REQUEST to another, and/or from one type of RESPONSE to another.

The overall format and content corresponding to the example provided above may also be applied to an object search by sound. As another non-limiting example, an automated diagnostic search system of the type described above could employ the following protocol to support a diagnosis/solution search.

```
REQUEST
    wlmp://wlmserver:1111/diagnose
    content-type: text/xml
    content-length: 2550
    <search>
        <machine>
            <manufacturer>
            <model>
        </machine>
        <state>
            <temperature>
            <waterHardness>
            <inputVoltage>
        </state>
        <symptoms>
            <errorCode>
        </symptoms>
    </search>
RESPONSE (multiple results)
<solution>
    <provider>
    <fix>
        <patch>
        <instructions>
        </instructions>
    </fix>
</solution>
```

For the above example, the first line of the REQUEST identifies the search engine (wlmserver:1111) and the type of search query, namely, a diagnostic search. The second line of the REQUEST identifies that the request includes text (in XML file format), and the third line of the REQUEST indicates the length or size of the content. The remainder of the REQUEST identifies certain characteristics of the device (e.g., manufacturer, model number, the operating state or condition of the device) and the detected problem (e.g., a list of symptoms and an error code).

The RESPONSE indicates that the search data corresponds to a solution. This example includes a number of fields and subfields of search data that describes or defines the solution. In particular, the RESPONSE may include a software or program patch, along with instructions for carrying out the recommended solution.

As mentioned previously, the manner in which the REQUEST and RESPONSE are formatted, the specific content of the REQUEST and the RESPONSE, the hierarchical arrangement of data fields, and the number of data fields at each hierarchical level may vary from one system to another, from one type of REQUEST to another, and/or from one type of RESPONSE to another.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An automated self-diagnostic method for a device having data connectivity to a remote network-based search engine, the method comprising:
   determining that the device requires a solution to a problem related to an environment surrounding the device, wherein the determining step is performed by the device using its native functionality and processing capabilities, and is performed automatically and autonomously by the device without any human involvement;
   automatically capturing, by one or more sensors onboard the device, information related to the environment surrounding the device;
   generating a search query intended to find information related to the solution, wherein the generating is performed by the device in response to the determining step, wherein the search query is generated in compliance with a format supported by the network-based search engine, and wherein the generating appends the captured information related to the environment surrounding the device to the search query;
   sending the search query including the captured information related to the environment surrounding the device to the remote network-based search engine, wherein the sending is performed by the device;
   after sending the search query, receiving a response that originates from the remote network-based search engine, wherein the response includes response data having a contextual association with the solution, the problem, or both, wherein the response data includes one or more descriptors of the captured information related to the environment surrounding the device, and wherein the receiving is performed by the device;
   processing at least some of the response data to determine a course of action, wherein the processing is performed by the device; and
   initiating the course of action at the device to thereby solve the problem.

2. The method of claim 1, wherein the capturing comprises obtaining a digital picture file corresponding to an image of an object, and wherein:
   the device obtains the digital picture file;
   the generating appends the digital picture file to the search query; and
   the search query includes a request to identify the object.

3. The method of claim 2, wherein the response data includes one or more descriptors of the object.

4. The method of claim 1, wherein the capturing comprises obtaining a digital audio file, and wherein:
   the device obtains the digital audio file;
   the generating appends the digital audio file to the search query; and
   the search query includes a request to identify at least one characteristic of sound conveyed by the digital audio file.

5. The method of claim 4, wherein the response data includes at least one potential source of the sound conveyed by the digital audio file.

6. The method of claim 1, wherein the capturing comprises obtaining a digital video file, wherein:
   the device obtains the digital video file;
   the generating appends the digital video file to the search query; and
   the search query includes a request for information related to subject matter conveyed by the digital video file.

7. The method of claim 6, wherein the response data includes one or more descriptors of the subject matter.

8. The method of claim 1, wherein:
   the determining acquires a self-diagnostic error code associated with the problem;
   the generating appends the error code to the search query; and
   the response data includes instructions that, when executed by the device, address the error code.

9. The method of claim 1, wherein:
   the remote network-based search engine has a uniform resource identifier (URI) associated therewith; and
   the search query includes the URI of the remote network-based search engine.

10. An automated self-diagnostic method for a device having data connectivity to a remote network-based search engine, the method comprising:
    receiving a search query at the remote network-based search engine, the search query intended to find information necessary for the device to address a self-diagnosed problem related to an environment surrounding the device, wherein the problem requires a solution, wherein the search query is automatically generated by the device using its native functionality and processing capabilities, and is generated automatically and autonomously by the device without any human involvement, wherein the search query includes captured information related to the environment surrounding the device, the captured information being automatically captured by one or more sensors onboard the device, and wherein the search query is arranged in compliance with a format supported by the remote network-based search engine;
    processing the search query to identify search parameters, wherein the processing is performed by the remote network-based search engine;
    searching for information using the search parameters and the captured information related to the environment surrounding the device, wherein the searching is performed by the remote network-based search engine;
    generating a response that includes response data related to the solution, wherein the response data includes one or more descriptors of the captured information related to the environment surrounding the device, and wherein the generating is performed by the remote network-based search engine; and
    sending the response to the device.

11. The method of claim 10, further comprising maintaining at least one solution database that includes solution data for supporting the device, wherein the maintaining is performed by the remote network-based search engine.

12. The method of claim 11, further comprising acquiring at least some of the solution data from a manufacturer, vendor, or provider of the device.

13. The method of claim 10, wherein:
    the captured information related to the environment surrounding the device includes a digital picture file corresponding to an image of an object as observed by the device; and
    the response data includes one or more descriptors of the object.

14. The method of claim 10, wherein:
    the captured information related to the environment surrounding the device includes a digital audio file that conveys sound captured by the device; and
    the response data includes at least one potential source of the sound conveyed by the digital audio file.

15. The method of claim 10, wherein:

the captured information related to the environment surrounding the device includes a digital video file that conveys video content captured by the device; and the response data includes one or more descriptors of the video content.

16. The method of claim 10, wherein:

the search query includes an error code associated with the problem, the error code being automatically generated by the device; and the response data includes instructions that, when executed by the device, address the error code.

17. An automated diagnostic system comprising:

a network-enabled device;

a remote network-based search engine; and a data communication network to facilitate data communication between the network-enabled device and the remote network-based search engine; wherein:

the network-enabled device automatically detects an issue associated with its operation in the context of an environment surrounding the network-enabled device using its native functionality and processing capabilities, and without any human involvement, automatically captures, by one or more sensors onboard the network-enabled device, information related to the environment surrounding the device, and automatically sends a corresponding search query to the remote network-based search engine using its native functionality and processing capabilities, and without any human involvement, the search query intended to find information related to a solution to the issue, wherein the network-enabled device appends the captured information related to the environment surrounding the device to the search query for sending to the remote network-based search engine;

the remote network-based search engine receives the search query including the captured information related to the environment surrounding the device and, in response to the search query, searches for relevant information pertaining to the issue and pertaining to the captured information related to the environment surrounding the device, and sends a corresponding response to the network-enabled device, the response including response data associated with the solution, wherein the response data includes one or more descriptors of the captured information related to the environment surrounding the device; and the network-enabled device receives the response, processes at least some of the response data to determine a course of action, and initiates the course of action.

18. The system of claim 17, wherein:

the network-enabled device generates the search query in accordance with a protocol used by the remote network-based search engine; and the remote network-based search engine generates the response in accordance with the protocol.

19. The system of claim 17, wherein the network-enabled device processes the response data to identify relevant information to be used with the course of action, and to identify irrelevant information that can be disregarded.

20. The system of claim 17, wherein the remote network-based search engine processes the search query to extract search parameters.

\* \* \* \* \*